(12) United States Patent
Fujita (10) Patent No.: US 7,476,458 B2
(45) Date of Patent: Jan. 13, 2009

(54) FUEL CELL SYSTEM

(75) Inventor: Nobuo Fujita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 744 days.

(21) Appl. No.: 10/828,300

(22) Filed: Apr. 21, 2004

(65) Prior Publication Data

US 2004/0229098 A1 Nov. 18, 2004

(30) Foreign Application Priority Data

May 14, 2003 (JP) ............... 2003-135455

(51) Int. Cl.
*H01M 8/00* (2006.01)
(52) U.S. Cl. ................... 429/25; 429/22
(58) Field of Classification Search ............ 429/12, 429/13, 34, 36, 38, 25, 22, 17
See application file for complete search history.

(56) References Cited

U.S. PATENT DOCUMENTS

| 2002/0094467 A1 | 7/2002 | Nonobe et al. |
| 2005/0026010 A1 | 2/2005 | Nonobe et al. |

FOREIGN PATENT DOCUMENTS

| DE | 102 01 893 A1 | 9/2002 |
| JP | A 2002-216812 | 8/2002 |
| JP | 2002-313403 | * 10/2002 |
| JP | A 2002-313403 | 10/2002 |

* cited by examiner

*Primary Examiner*—Patrick Ryan
*Assistant Examiner*—Monique Wills
(74) *Attorney, Agent, or Firm*—Oliff & Berridge PLC (57) ABSTRACT

A water trap having a discharge valve is disposed in a gas flow passage of a fuel cell system. It is judged whether or not water is accumulated inside the water trap based on pressure variation inside the gas flow passage when the discharge valve is kept open.

16 Claims, 10 Drawing Sheets

FUEL CELL SYSTEM

BACKGROUND OF THE INVENTION

1. Field of the Invention

The present invention relates to discharge of impurities in a fuel cell system for generating electricity by means of an electrochemical reaction between hydrogen and oxygen.

2. Description of the Related Art

In recent years attention has been focused on fuel cells that generate electricity by means of an electrochemical reaction between hydrogen and oxygen as an energy source. In this type of fuel cell system, when the ambient temperature goes down to sub-zero while the system stops operating for a while, water inside the fuel cell system may freeze, resulting in a impediment to operation. Further, there is also the possibility that this freezing might degrade the fuel cell system. There has been proposed a water trap for temporarily accumulating water and then discharging the accumulated water from a discharge port of the water trap to the outside (for example, JP2002-313403A).

It is preferable to discharge water accumulated in the water trap in a manner such that the water does not freeze when temperatures are low. The accumulated water can be detected by means of a water level sensor in the water trap. There is a chance, however, that the range a water level sensor can detect water will be limited. For example, when the quantity of accumulated water is small, there is a chance that water level sensor may not be able to detect the water. In this case, there is a possibility that water may not be detected and remain in the water trap.

In another method, the accumulated water may be discharged by opening the discharge port for a fixed time. The quantity of water accumulated in the water trap, however, depends on the operating conditions of the fuel cell. As a result, when there is a large quantity of accumulated water, the opening time of the discharge port will be insufficient, resulting in substantial quantity of water being left in the water trap.

SUMMARY OF THE INVENTION

An object of the present invention is to provide a technology that can judge whether or not water is accumulated inside a water trap regardless of the quantity of accumulated water.

According to one aspect of the invention, there is provided a fuel cell system comprising: a fuel cell; a gas flow passage for use in at least either of supplying a specific gas to the fuel cell and discharging a discharge gas from the fuel cell; a water trap, disposed in the gas flow passage, for accumulating water in the gas flow passage, the water trap having a discharge valve for discharging the accumulated water to outside of the gas flow passage; a discharge valve controller for controlling open/close state of the discharge valve; a pressure measurement unit for measuring a pressure inside the gas flow passage; and a judgment unit for judging whether or not water is accumulated in the water trap based on pressure variation measured by the pressure measurement unit while the discharge valve is being kept open.

According to this fuel cell system, a judgment is made as to whether or not water is accumulated inside the water trap based on pressure variation when the valve is kept in an open state. Because of this, whether or not water is accumulated inside the water trap can be judged regardless of the quantity of accumulated water.

The present invention can be realized in various forms such as computer programs that implement the functions of these methods or devices, recording media whereon is recorded these computer programs, data signals embedded in a carrier waves containing these computer programs, and vehicles in which is installed a fuel cell system as a drive power source,.

These and other objects, features, aspects, and advantages of the present invention will become more apparent from the following detailed description of the preferred embodiments with the accompanying drawings.

BRIEF DESCRIPTION OF THE DRAWINGS

FIGS. 2(*a*) and 2(*b*) show the configuration of the water trap.

FIGS. 5(*a*) and 5(*b*) show two states of the water trap.

DESCRIPTION OF THE PREFERRED EMBODIMENT

Embodiments of the present invention will be described in the following order.
A. First embodiment:
B. Second embodiment:
C. Third embodiment:
D. Fourth embodiment:
E. Modifications

A. First Embodiment

A1. System Configuration

Figure 1:
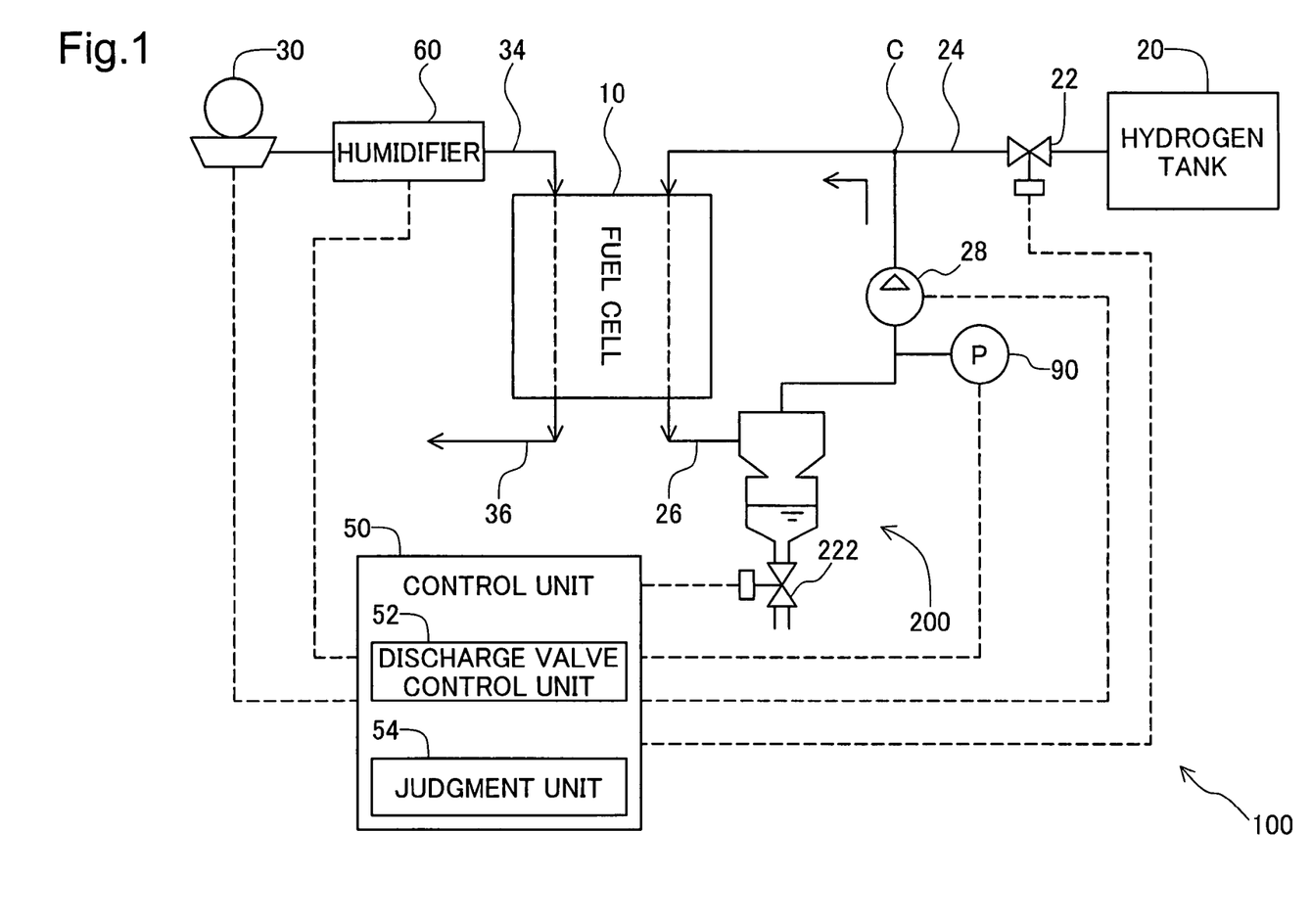
FIG. 1 is a block diagram showing the configuration of the fuel cell system 100.

FIG. 1 is a block diagram showing the configuration of the fuel cell system 100 as an embodiment of the present invention. This fuel cell system 100 comprises a fuel cell 10, a hydrogen tank 20, a blower 30, a control unit 50, a water trap 200, and a pressure sensor 90.

The fuel cell 10 is of a solid polymer electrolyte type and has a stack of a plurality of single cells. Each single cell is comprised of an electrolyte inserted between a hydrogen electrode (anode) and an oxygen electrode (cathode). An electrochemical reaction occurs between a fuel gas that contains hydrogen supplied to the anode and an oxygen gas supplied to the cathode, thereby generating an electromotive force. The electrical power generated in the fuel cell 10 is supplied to a designated load (not shown in the drawing) connected to the fuel cell 10. In addition to the solid polymer electrolyte type, various types of fuel cells can be used for the fuel cell 10 such as an alkaline aqueous electrolyte type, a phosphoric acid electrolyte type and a fused carbonate electrolyte type.

The blower 30 supplies air as oxidation gas to the cathode gas inlet of the fuel cell 10. The blower 30 is connected to the cathode gas inlet of the fuel cell 10 through a cathode gas supply flow path 34. A humidifier 60 is disposed in the cathode gas supply flow path 34. Air compressed by the blower 30 is supplied to the fuel cell 10 after being humidified by the humidifier 60. Discharge gas from the cathode after undergoing an electrochemical reaction (hereinafter referred to as cathode discharge gas) is discharged to the outside through a cathode discharge gas flow passage 36.

A hydrogen tank 20 stores hydrogen gas and is connected to the anode gas inlet of the fuel cell 10 through an anode gas supply flow path 24. A regulator 22 is disposed proximate to the hydrogen tank 20 of the anode gas supply flow path 24. The regulator 22 reduces the pressure of high-pressure hydrogen gas supplied from the hydrogen tank 20 to the anode gas supply flow path 24. The reduced pressure hydrogen gas is supplied to the anode gas inlet of the fuel cell 10. The value of the reduced pressure can be suitably set in accordance with the magnitude of the load on the fuel cell 10.

The hydrogen tank 20 may be replaced by a device that generates hydrogen by means of a reforming process of raw material such as alcohol, hydrocarbons and aldehyde and then supplies this hydrogen to the anode gas inlet.

The discharge gas from the anode after undergoing an electrochemical reaction (hereinafter referred to as anode discharge gas) is discharged from the fuel cell 10 through an anode discharge gas flow passage 26. The anode discharge gas flow passage 26 is connected to the anode gas supply flow path 24 at a connection C. In this manner, the anode discharge gas flow passage 26 forms a circulation path that returns anode discharge gas to the anode gas supply flow path 24 again.

The anode discharge gas flow passage 26 is provided with a circulation pump 28, a pressure sensor 90 and a water trap 200. The circulation pump 28 circulates the anode discharge gas. Hydrogen contained in the anode discharge gas is used to generate power by means of circulating the anode discharge gas.

The water trap 200 accumulates water that is present in the anode discharge gas flow passage 26. There is also a possibility that the anode discharge gas might contain impurities other than hydrogen. Examples of these impurities include water vapor generated by electrochemical reaction, nitrogen gas or water vapor that has passed through the electrolyte membrane from the cathode side. In this specification, "impurities" in the anode gas supply flow path 24 and the anode discharge gas flow passage 26 refer to components other than fuel gas. These impurities remain without being consumed in the fuel cell. Consequently, the concentration of the impurities within the anode discharge gas increases gradually over time. From among these impurities the water is accumulated in the water trap 200. The water trap 200 comprises a discharge valve 222 for discharging accumulated water to the outside of the anode discharge gas flow passage 26.

If the discharge valve 222 is open when no water is accumulated in the water trap 200, anode discharge gas containing impurities such as nitrogen or water vapor will be discharged to the outside of the anode discharge gas flow passage 26, thereby reducing the circulating quantity of impurities. However, hydrogen (or fuel gas) will also be discharged at the same time. Because of this, reducing the discharge quantity of the gas is preferable to improve fuel efficiency. Incidentally, there is also a possibility that other components might enter into the anode discharge gas as impurities because of use of a fuel cell of a type other than the solid polymer electrolyte type or because of the environment of the fuel cell 10.

The pressure sensor 90 measures the pressure inside the anode discharge gas flow passage 26. The measured pressure is used during a discharge process for discharging impurities inside the anode discharge gas flow passage 26 through the discharge valve 222, as will be described later in detail. The pressure sensor 90 need not be disposed between the water trap 200 and the circulation pump 28, and it can be disposed between the circulation pump 28 and the fuel cell 10 or between the fuel cell 10 and the water trap 200.

The control unit 50 is constituted by a logic circuit including a micro computer. In more detail, the control unit 50 comprises a CPU that executes specified calculations according to a control program set in advance, a ROM that stores control programs and control data required to execute each calculation process performed by the CPU, a RAM for temporarily storing various types of data required to execute operations by the CPU, and I/O ports where various signals are input and output. The control unit 50 also acquires information related to fuel cell output requirements, outputs drive signals to each member comprising the fuel cell system 100 (including each valve and blower described above) and controls the overall operating state of the fuel cell system 100.

The control unit 50 functions as a discharge valve control unit 52 that controls the open/close state of the discharge valve 222 and also functions as a judgment unit 54 that judges whether or not water is accumulated in the water trap 200. These functions will be described later in detail. Each function can be implemented by software such as a control program while part or all of the functions can be realized by hardware.

Figure 2A:
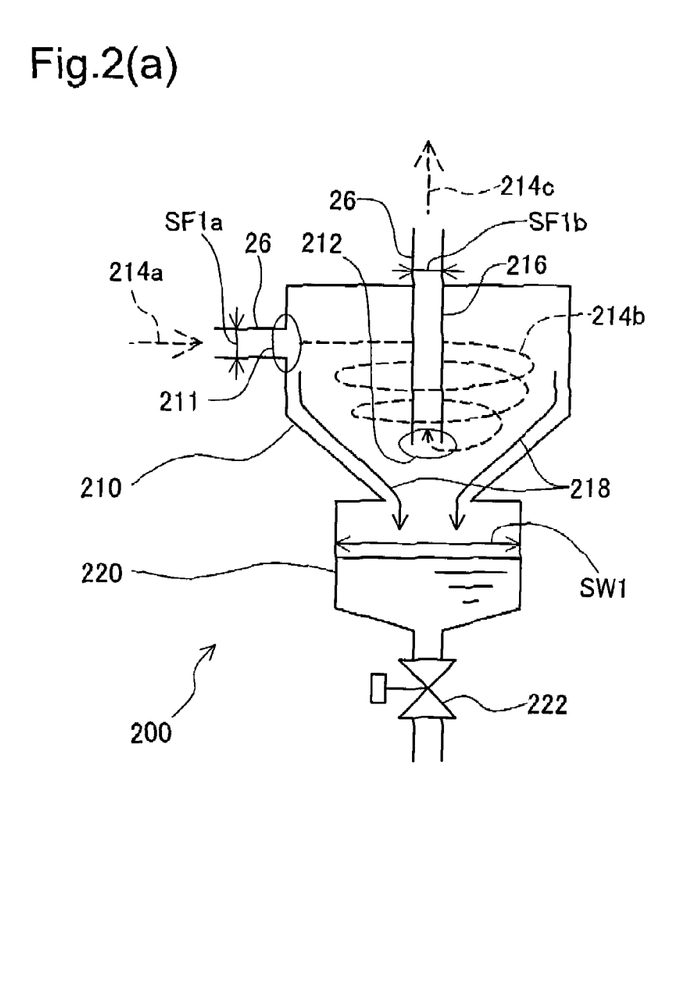

FIG. 2(a) is a vertical cross-section of the water trap 200 in this embodiment. The water trap 200 comprises a cyclone separator 210 and a liquid pool section 220.

Figure 2B:
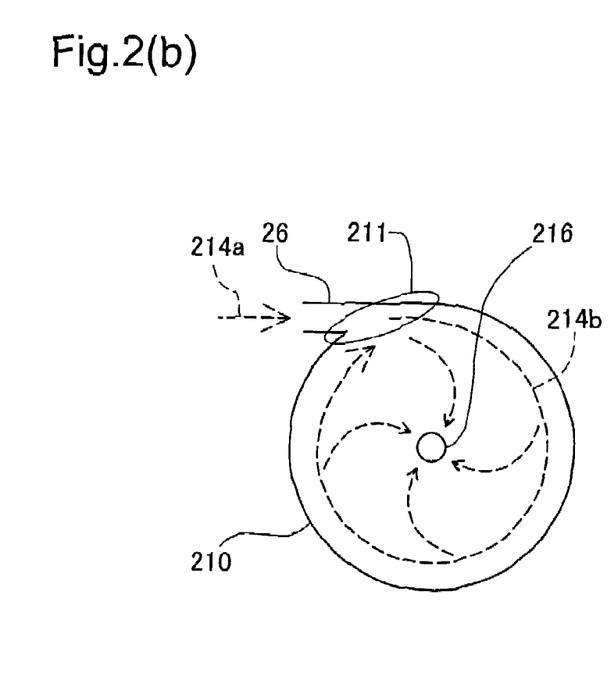

FIG. 2(b) is a horizontal cross-section of the cyclone separator 210. The cyclone separator 210 functions as a gas-liquid separator that collects, as liquid water, water vapor contained in the incoming gas. The cyclone separator 210 has a cylindrical structure that extends in the vertical direction downward as shown in FIG. 2(a). A flow inlet, indicated by circle 211, is provided on the side wall of the cyclone separator 210, and is connected to the anode discharge gas flow passage 26 extending in a direction tangent to the cylindrical wall. An outflow path 216 used for gas outflow is provided at the center of the cyclone separator 210. One end of the outflow path 216 has a flow outlet indicated by circle 212 in FIG. 2(a), and the other end is connected to the anode discharge gas flow passage 26 at the top of the cyclone separator 210.

The arrows 214a~214c of the dotted lines shown in FIGS. 2(a) and 2(b) indicate the flow of the anode discharge gas, and the arrow 218 of the solid line indicates the flow of water on the wall. While anode gas flowing in from the flow inlet, indicated by circle 211, revolves along the wall inside the cyclone separator 210, the gas flows towards the flow outlet, indicated by circle 212. During this circular motion, water vapor contained in the anode discharge gas is pressed against the wall and condensed on the wall. The liquid water falls downward along the wall and is collected in the liquid pool section 220.

The liquid pool section 220 stores the water collected by the cyclone separator 210. The discharge valve 222 is provided on the bottom of the liquid pool section 220. Water accumulated in the liquid pool section 220 and anode discharge gas can be discharged by means of opening the discharge valve 222.

A2. Water Trap Control Process

Figure 3:
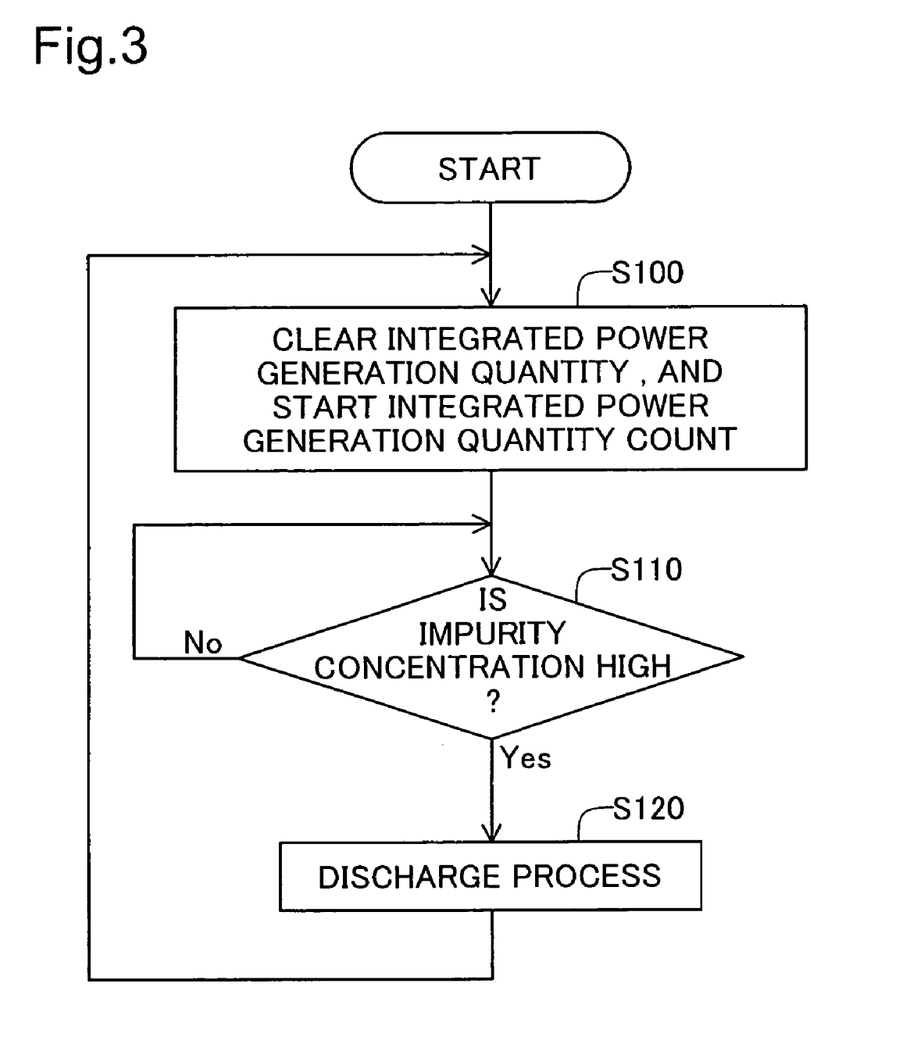
FIG. 3 is a flowchart showing a water trap control routine.

FIG. 3 is a flowchart showing a water trap control routine executed by the discharge valve control unit 52 and the judgment unit 54 of the control unit 50 (FIG. 1).

The discharge valve control unit 52 starts counting of integrated power generation amount of the fuel cell 10 after initializing the count to 0 in step S100.

In step S110, the discharge valve control unit 52 judges whether or not the impurity concentration in the anode discharge gas flow passage 26 is higher than a reference concentration. This judgment is executed based on a parameter value related to the impurity concentration. In this embodiment, the integrated power generation amount of the fuel cell whose count started in step S100 is used as the parameter value related to the impurity concentration.

The integrated power generation amount of the fuel cell 10 increases together with the integrated amount of oxidation gas supply. As a result, the quantity of impurities that permeates the electrolyte membrane increase together with increase in the integrated power generation amount. Further, the quantity of water vapor generated by the electrochemical reaction in the fuel cell 10 also increases together with the increase in the integrated power generation amount. Consequently, it can be assumed that the impurity concentration increases as the integrated power generation amount increases.

In this embodiment, the discharge valve control unit 52 judges that the impurity concentration is higher than a reference concentration when the integrated power generation amount whose count is started in step S100 is equal to or more than a predetermined reference integrated power generation amount. If a judgment that the impurity concentration is higher than the reference value is established (step S110: Yes), the discharge valve control unit 52 execute a discharge process in step S120 wherein the discharge valve 222 (FIG. 1) is opened to discharge the impurities (described later in detail). If a judgment that the impurity concentration is higher than the reference value is not established (step S110: No), the process will repeat step S110 until a judgment that the impurity concentration is higher than the reference value is established.

After the discharge process in step S120 is completed, the process returns to step S100 again, and restarts the count of the integrated power generation amount. Thereafter, the routine of steps S100~S120 will repeat.

Figure 4:
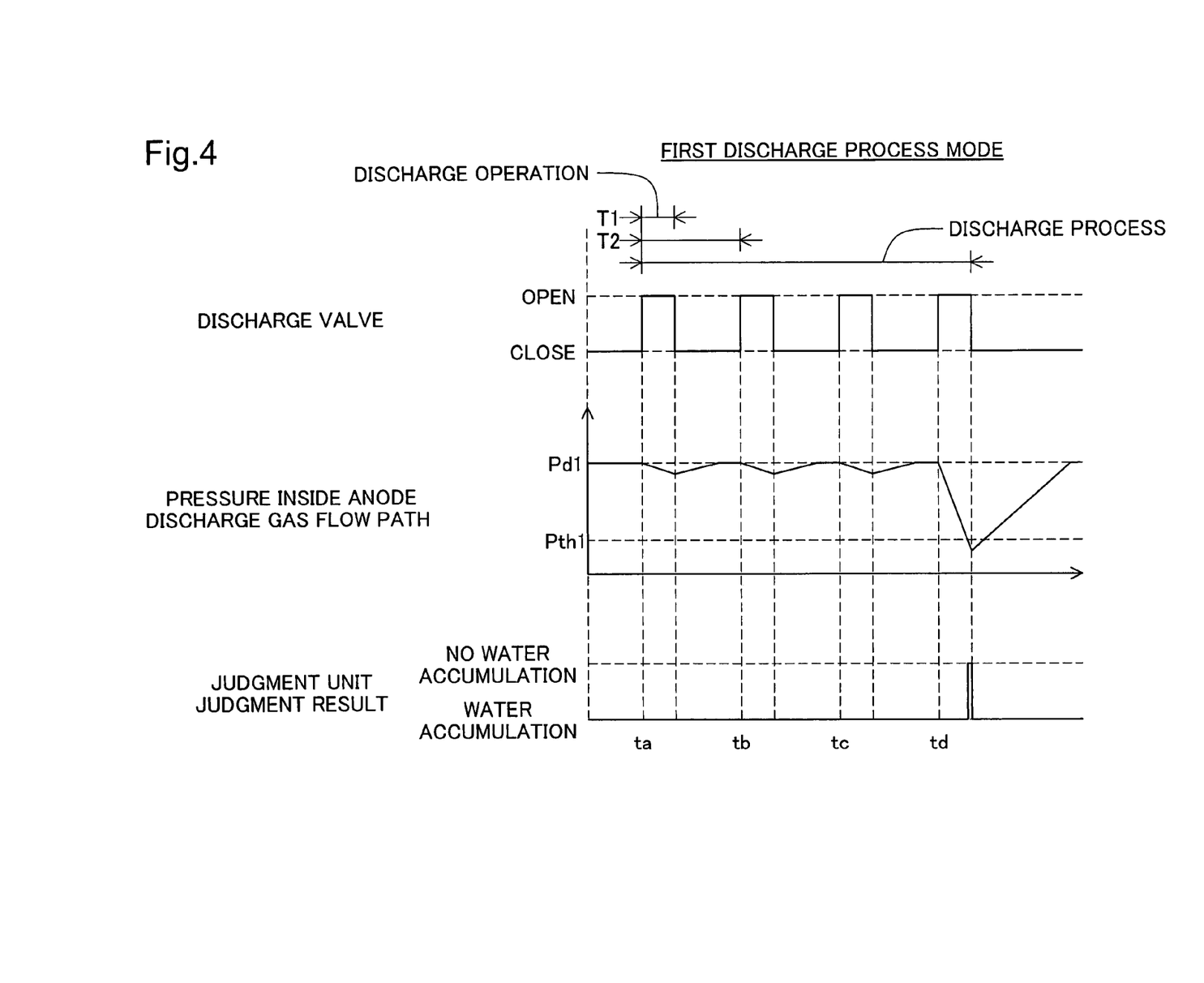
FIG. 4 is a timing chart showing the operation of the first discharge process mode.

A3. Discharge Process:

FIG. 4 is a timing chart describing the operation of the first discharge process mode as an example of the discharge process of step S120 in FIG. 3. The timing chart of FIG. 4 shows changes over time of the open/close state of the discharge valve 222 (FIG. 2), changes in the pressure inside the anode discharge gas flow passage 26 following the opening/closing of the discharge valve 222, and changes over time of the judgment result by the judgment unit 54.

In the first discharge process mode shown in FIG. 4, the discharge valve control unit 52 (FIG. 1) repeats a discharge operation in a regular period T2 while the discharge valve 222 (FIG. 2) is open for a fixed discharge time T1.

The pressure inside the anode discharge gas flow passage 26 is at an operating pressure Pd1, which depends on the magnitude of the load on the fuel cell, before the discharge process (before timing ta). When the discharge valve 222 opens, the accumulated water and/or anode discharge gas is discharged through the discharge valve 222. Because of this, the pressure inside the anode discharge gas flow passage 26 falls. After the discharge valve 222 is closed again, the pressure inside the anode discharge gas flow passage 26 is restored to the operating pressure Pd1 due to the hydrogen gas supply through the regulator 22 (FIG. 1).

The discharge operation is repeatedly executed in the example of FIG. 4. The pressure drop is relatively small in the first three times (discharge operation executed at timing ta, tb, and tc). In contrast, the pressure drop is relatively large in the fourth discharge operation (discharge operation executed at timing td).

Figures 5A, 5B:
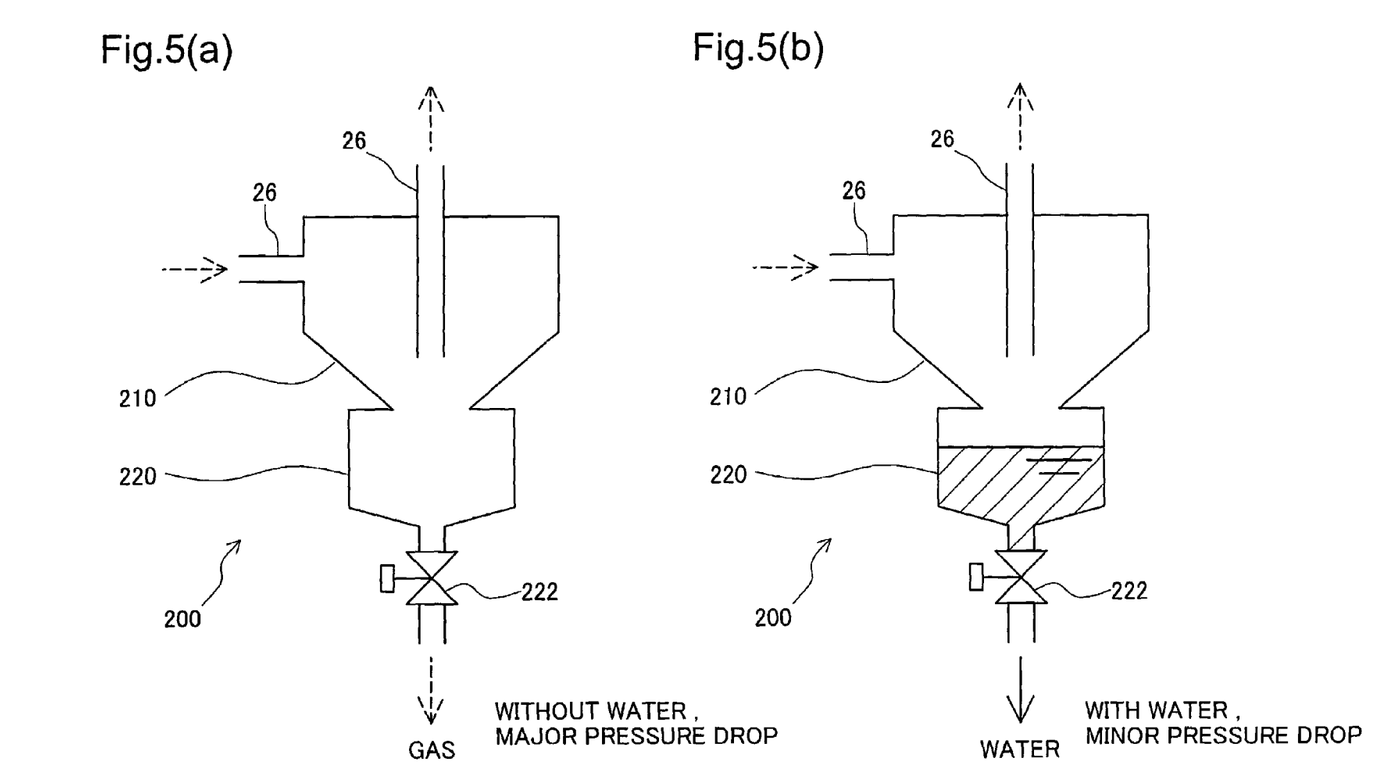

FIGS. 5(a) and 5(b) show two states of the water trap when the discharge valve 222 is open. FIG. 5(a) shows a case when water is not accumulated in the water trap 200 while FIG. 5(b) shows a case when water is accumulated in the water trap 200.

As shown in FIG. 5(a), if the discharge valve 222 is open when water is not accumulated in the water trap, the anode discharge gas will be discharged through the discharge valve 222. As a result, the pressure inside the anode discharge gas flow passage 26 substantially drops. In contrast, as shown in FIG. 5(b), water will be discharged through the discharge valve 222 when water is accumulated in the water trap. Generally, liquid has a higher viscosity compared to a gas. Consequently, if the discharge valve 222 is open for a fixed length of time, the volume of water discharged in the state of FIG. 5(b) is smaller than the volume of the anode discharge gas discharged from the water trap 200 in the state of FIG. 5(a). As a result, the pressure drop when water is accumulated becomes smaller than that when water is not accumulated.

In this manner, it is possible to judge that water is accumulated in the water trap 200 when the pressure drop inside the anode discharge gas flow passage 26 is small during the discharge operation. In contrast, it is possible to judge that water is not accumulated when the pressure drop is sufficiently large.

The judgment unit 54 (FIG. 1) judges whether or not water is accumulated in the water trap 200 based on the measurement result of the pressure sensor 90. FIG. 4 shows a gas-discharge pressure Pth1 that is lower than the operating pressure Pd1. The gas-discharge pressure Pth1 is a threshold value used for the judgment.

In this embodiment, the judgment unit 54 judges that water is accumulated when the pressure inside the anode discharge gas flow passage 26 measured by the pressure sensor 90 does not drop to the gas-discharge pressure Pth1 while the discharge valve control unit 52 is executing the discharge operation. In contrast, the judgment unit 54 judges that water is not accumulated when the pressure inside the anode discharge gas flow passage 26 is equal to or drops below the gas-discharge pressure Pth1. In the example of FIG. 4, the pressure does down to the gas-discharge pressure Pth1 during the fourth discharge operation (discharge operation executed at timing td).

It is preferable to set the gas-discharge pressure Pth1 lower than the lowest possible pressure of the flow path 26 which can be attained during the discharge operation when water is accumulated in the liquid pool section 220. Furthermore, it is preferable to set the gas-discharge pressure Pth1 higher than the lowest possible pressure of the flow path 26 which can be attained during the discharge operation when water is not accumulated in the liquid pool section 220. This makes it possible to prevent the pressure inside the anode discharge gas flow passage 26 from dropping to the gas-discharge pressure Pth1 when water is accumulated in the liquid pool section 220, namely, when water is accumulated in the water trap 200. In contrast, the pressure inside the anode discharge gas flow passage 26 can be reduced to be equal to or less than the gas-discharge pressure Pth1 when water is not accumulated in the water trap 200.

The discharge valve control unit 52 repeats the discharge operation until the judgment unit 54 establishes a "judgment that water is not accumulated in the water trap 200." The discharge operation will discharge water when it is executed while water is accumulated in the water trap 200. Therefore, water inside the water trap 200 can be reliably discharged by means of repeating the discharge operation until the judgment that water is not accumulated is established, thereby preventing water from remaining in the water trap 200. Thereafter, the discharge valve control unit 52 stops repeating the discharge operation to complete the discharge process.

In this manner, it is possible to properly judge whether or not water is accumulated in the water trap 200 regardless of the quantity of water accumulated in the water trap 200 by means of the judgment unit 54 comparing the pressure inside the anode discharge gas flow passage 26 with the gas-discharge pressure Pth1 in the first discharge process mode.

It is preferable that the period T2 of discharge operation (FIG. 4) is set to a period of time sufficient to restore the pressure that dropped due to the discharge operation to the original pressure. If a subsequent discharge operation is executed before the pressure is restored, there is a possibility that the pressure may substantially drop regardless of whether or not water is accumulated in the water trap 200, and a judgment that water is not accumulated may be mistakenly established. If the period T2 is sufficient for the pressure recovery, mistakenly establishing the above judgment can be avoided. Incidentally, it is not necessary to repeat the discharge operation at a fixed period. The judgment unit 54 can properly perform judgments in each discharge operation.

As described above, the first discharge process mode executes control of the discharge valve 222 such that it opens for a predetermined discharge time T1 in a single discharge operation. Consequently, it is not necessary to change the open/close state of the discharge valve 222 in synchronism with an externally provided timing. Because of this, the configuration of the discharge valve control unit 52 and the discharge valve 222 can be simplified.

Furthermore, in the first discharge process mode, the anode discharge gas is discharged through the discharge valve 222 when the pressure inside the anode discharge gas flow passage 26 drops to a level equal to or less than the gas-discharge pressure Pth1. As a result, the impurities contained in the anode discharge gas are also discharged, thereby reducing the circulation quantity of impurities. If the first discharge process mode is executed in this manner, liquid and gas impurities can both be discharged without providing a separate valve to discharge impurity gas such as nitrogen.

Since hydrogen gas (fuel gas) is also contained in the anode discharge gas, it is therefore preferable to avoid excessive discharge of the anode discharge gas from the viewpoint of fuel efficiency. When a judgment that the impurity concentration is high is established in the water trap control routine shown in FIG. 3 (step S110: Yes), the discharge process is executed in step S120. As a result, anode discharge gas with a high impurity concentration is discharged in the discharge process, thereby avoiding excessive discharge of hydrogen gas.

B. Second Embodiment

In the first embodiment described above, the discharge quantity of the anode discharge gas during the discharge operation may be adjusted higher as the impurity concentration becomes higher. In the first discharge process mode shown in FIG. 4, the discharge quantity of the anode discharge gas can be adjusted by adjusting the discharge time T1 when the discharge valve 222 (FIGS. 1, 2) is open.

Figure 6:
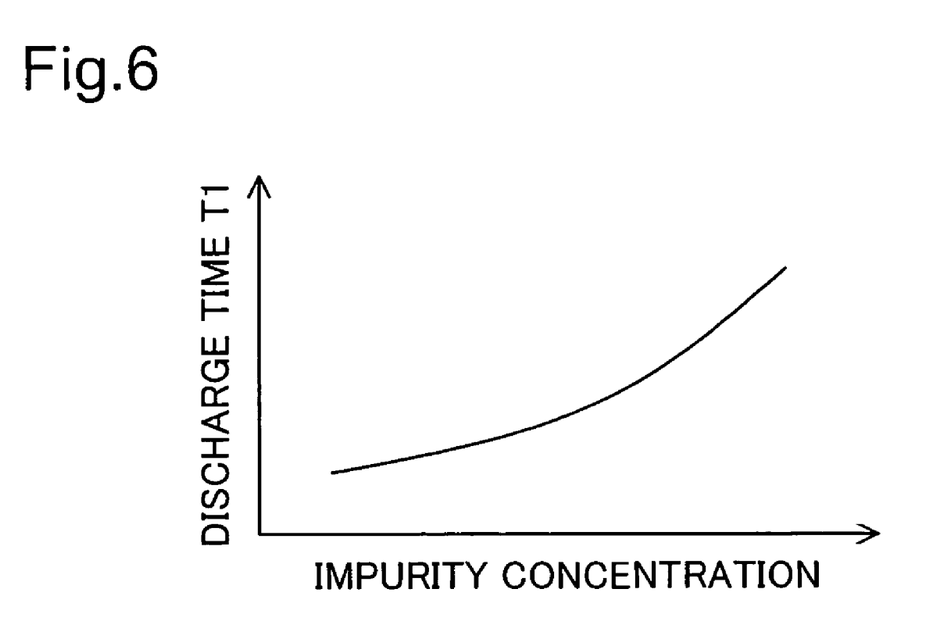
FIG. 6 is a graph the relationship between the impurity concentration and the discharge time T1.

FIG. 6 shows an example of the relationship between the impurity concentration and the discharge time T1 in the second embodiment. The horizontal axis shows the impurity concentration at the time of the discharge operation, and the vertical axis shows the discharge time T1. It is possible to avoid excessive discharge of hydrogen gas by making the discharge time T1 relatively short and making the discharge quantity of the anode discharge gas relatively small when the impurity concentration is relatively low in this manner. Further, it is also possible to prevent the impurity concentration from becoming higher by making the discharge time T1 relatively long and making the discharge quantity of the anode discharge gas relatively large when the impurity concentration is relatively high.

The discharge process is executed when the impurity concentration becomes higher than a reference value (impurity concentration corresponding to a reference integrated power generation amount) in the water trap control routine shown in FIG. 3. Consequently, it is possible to efficiently reduce the impurity concentration while avoiding excessive discharge of hydrogen gas by adjusting the discharge time T1 based on the impurity concentration.

In this embodiment, it is preferable to set the discharge operation period T2 short enough that the discharge operation starts again before the impurity concentration becomes higher than the reference value after the previous discharge operation. The period T2 in the water trap control routine shown in FIG. 3 can be set to a time shorter than the time during which the impurity concentration becomes higher than the reference value after the previous discharge process. For example, the period T2 can be set to a time that is shorter than the time during which the impurity concentration comes up again to the reference value when the maximum quantity of power generated from the fuel cell 10 (FIG. 1) is continuously output. Accordingly, it is possible to prevent the impurity concentration from increasing too much before the discharge process is complete.

C. Third Embodiment

Figure 7:
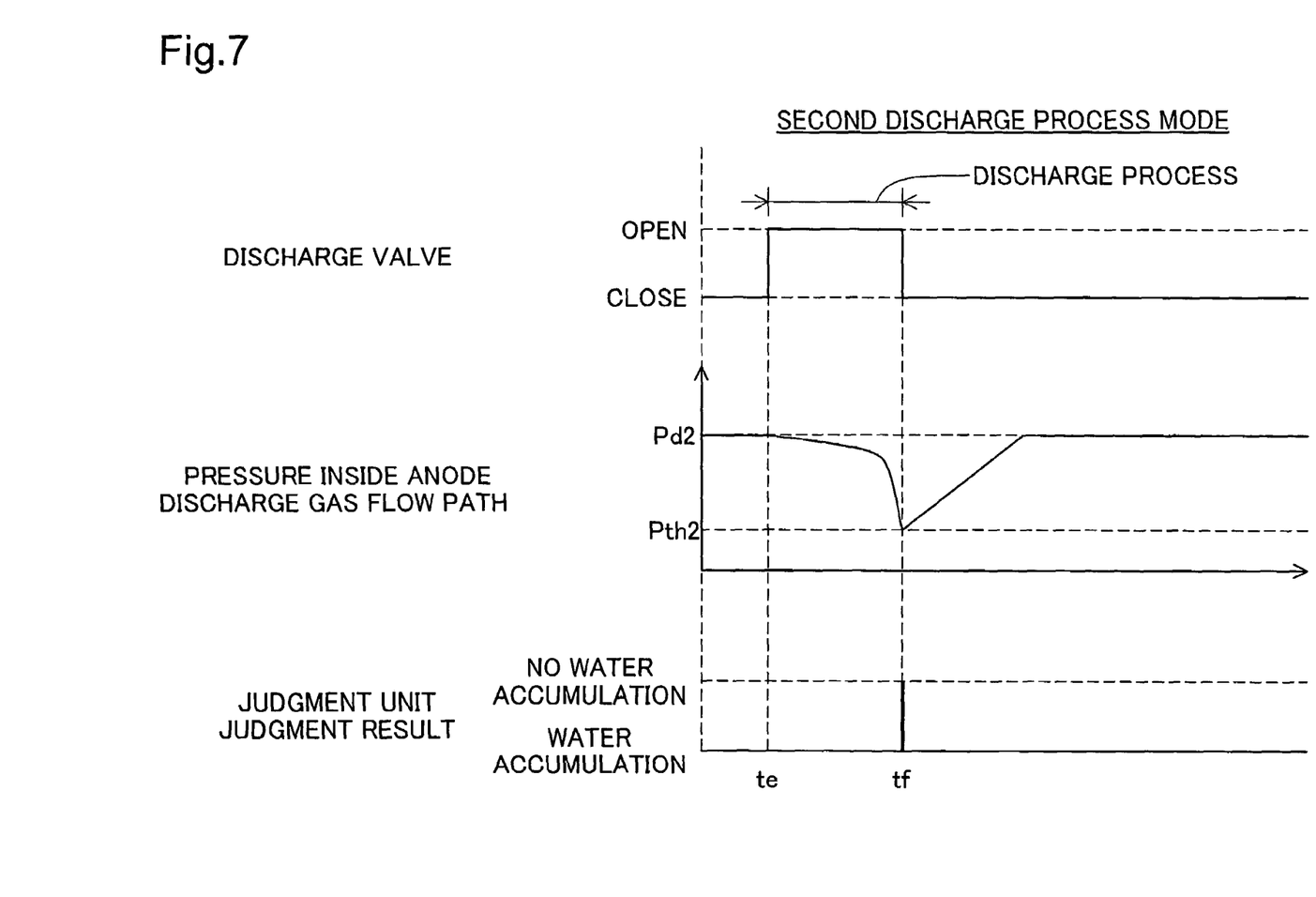
FIG. 7 is a timing chart showing the operation of the second discharge process mode.

FIG. 7 is a timing chart describing the operation of the second discharge process mode as another example of the discharge process of step S120 in the water trap control routine shown in FIG. 3. The difference from the first discharge process mode shown in FIG. 4 is that the discharge valve 222 opens and then closes in response to the judgment unit 54 establishing a "judgment that water is not accumulated" in the second discharge process mode.

In the example of FIG. 7, the discharge valve control unit 52 (FIG. 1) opens the discharge valve 222 (FIG. 2, FIG. 5) at timing te. Water accumulated in the water trap 200 is discharged through the open discharge valve 222 accordingly. The pressure inside the anode discharge gas flow passage 26 drops from an operating pressure Pd2 by a relatively small degree along with the discharge of the water. The operating pressure Pd2 depends on the magnitude of the load on the fuel cell.

When the water inside the water trap 200 is fully discharged, the anode discharge gas begins to go out through the discharge valve 222. The pressure inside the anode discharge gas flow passage 26 drops by a relatively large degree along with the discharge of the gas.

FIG. 7 shows a predetermined gas-discharge pressure Pth2 that is lower than the operating pressure Pd2. The judgment unit 54 (FIG. 1) judges that water is not accumulated when the pressure inside the anode discharge gas flow passage 26 is equal to or less than the gas-discharge pressure Pth2.

In the second discharge process mode, it is preferable for the gas-discharge pressure Pth2 to be set lower than the lowest possible pressure that can be attained when the maximum quantity of water that can be stored in the water trap 200 is continuously discharged. This setting makes it possible to prevent the pressure inside the anode discharge gas flow passage 26 from going down to the gas-discharge pressure Pth2 while water is remaining in the water trap 200 when the discharge valve 222 is open. In contrast, when the discharge of water accumulated in the water trap 200 is completed and the anode discharge gas starts to go out, the pressure inside the anode discharge gas flow passage 26 will go down under the gas-discharge pressure Pth2. As a result, the judgment unit 54 can properly judge whether or not water is present inside the water trap 200 regardless of the quantity of water accumulated in the water trap 200 by comparing the pressure inside the anode discharge gas flow passage 26 and the gas-discharge pressure Pth2.

The discharge valve control unit 52 closes the discharge valve 222 (timing tf), and completes the discharge process in response to the judgment unit 54 establishing a "judgment that water is not accumulated."

In the second discharge process mode described above, the discharge valve control unit 52 maintains the discharge valve 222 in an open state until establishing a "judgment that water is not accumulated", and then changes the discharge valve 222 to a closed state in response to establishing a "judgment that water is not accumulated". Consequently, water inside the water trap 200 can be reliably discharged.

When the pressure inside the anode discharge gas flow passage 26 drops down to the gas-discharge pressure Pth2, the anode discharge gas will be discharged through the discharge valve 222. As a result, impurities contained in the anode discharge gas will also be discharged, thereby reducing the circulating quantity of impurities. The second discharge process mode can discharge liquid and gas impurities without providing a separate valve to discharge impurity gas such as nitrogen.

It is preferable to prevent excessive discharge of the anode discharge gas from the viewpoint of fuel efficiency. If the gas-discharge pressure Pth2 is set higher in the second discharge process mode, the quantity of gas can be reduced. In other words, the discharge quantity of anode discharge gas can be adjusted by adjusting the gas-discharge pressure Pth2.

D. Fourth Embodiment

Figure 8:
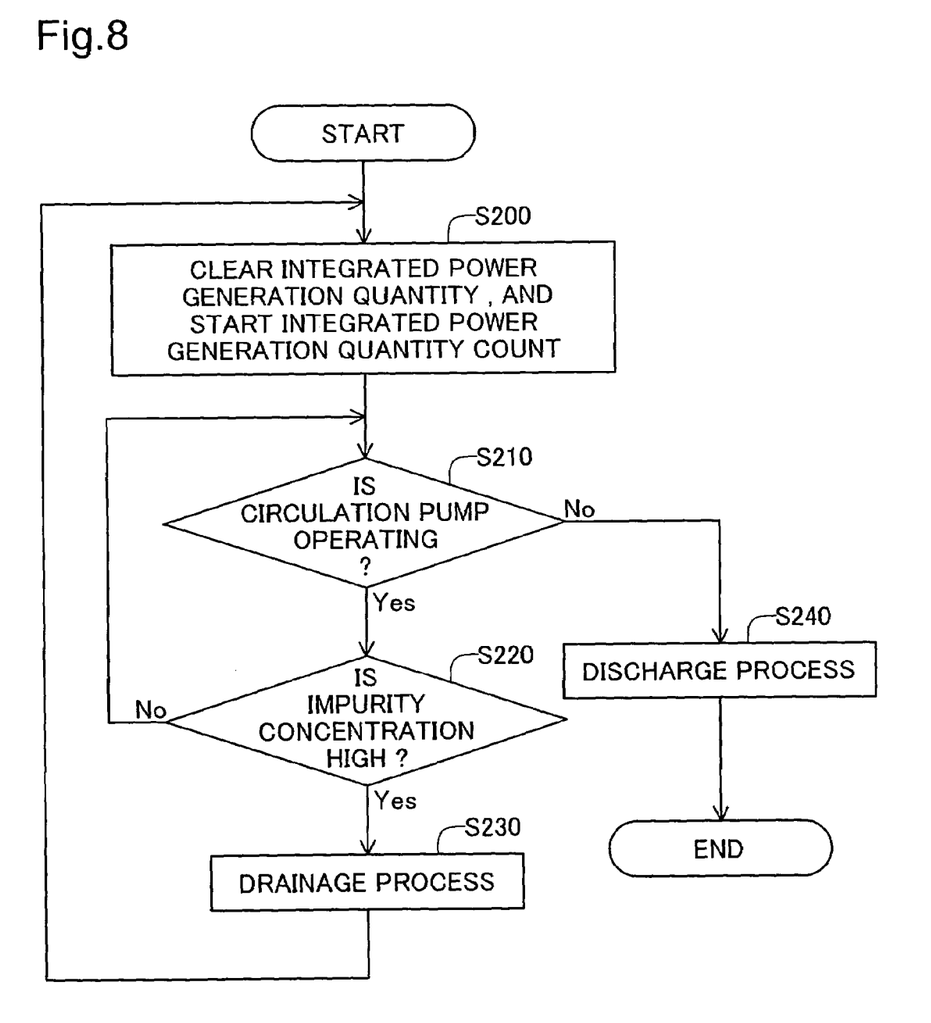
FIG. 8 is a flowchart showing a water trap control routine.

FIG. 8 is a flowchart that shows another embodiment of a water trap control routine. There are two differences from the embodiment of the water trap control routine shown in FIG. 3. The first difference is that the discharge process described above is executed when the circulation pump 28 (FIG. 1) is not operating. The second difference is that a drainage process is executed when a judgment is established that the impurity concentration is high while the circulation pump 28 is operating. Here, the drainage process is a process that discharges water accumulated in the water trap 200 without discharging the anode discharge gas.

The possibility of water freezing inside the anode discharge gas flow passage 26 increases when gas is not flowing inside the flow path 26, or when the fuel cell system 100 is not operating. The discharge process is therefore executed when the circulation pump 28 is not operating in this embodiment.

The discharge valve control unit 52 starts a count of the integrated power generation amount of the fuel cell 10 in step S200. This step S200 is the same as step S100 in FIG. 3.

The control unit detects the operation state of the circulation pump 28 in step S210. When the circulation pump 28 is operating (step S210: Yes), the control unit judges whether or not the impurity concentration inside the anode discharge gas flow passage 26 is higher than a reference concentration in step S220. This step S220 is the same as step S110 in FIG. 3, and the judgment is made as a result of comparison between the integrated power generation amount, whose counted was started in step S200, and a predetermined reference integrated power generation amount.

When a judgment that the impurity concentration is higher than the reference concentration is not established (step S220: No), the process returns to step S210 again.

If the judgment that the impurity concentration is higher than the reference concentration is established (step S220: Yes), the discharge valve control unit 52 opens the discharge valve (FIG. 1), and executes the drainage process to drain water accumulated in the water trap 200 in step S230.

Figure 9:
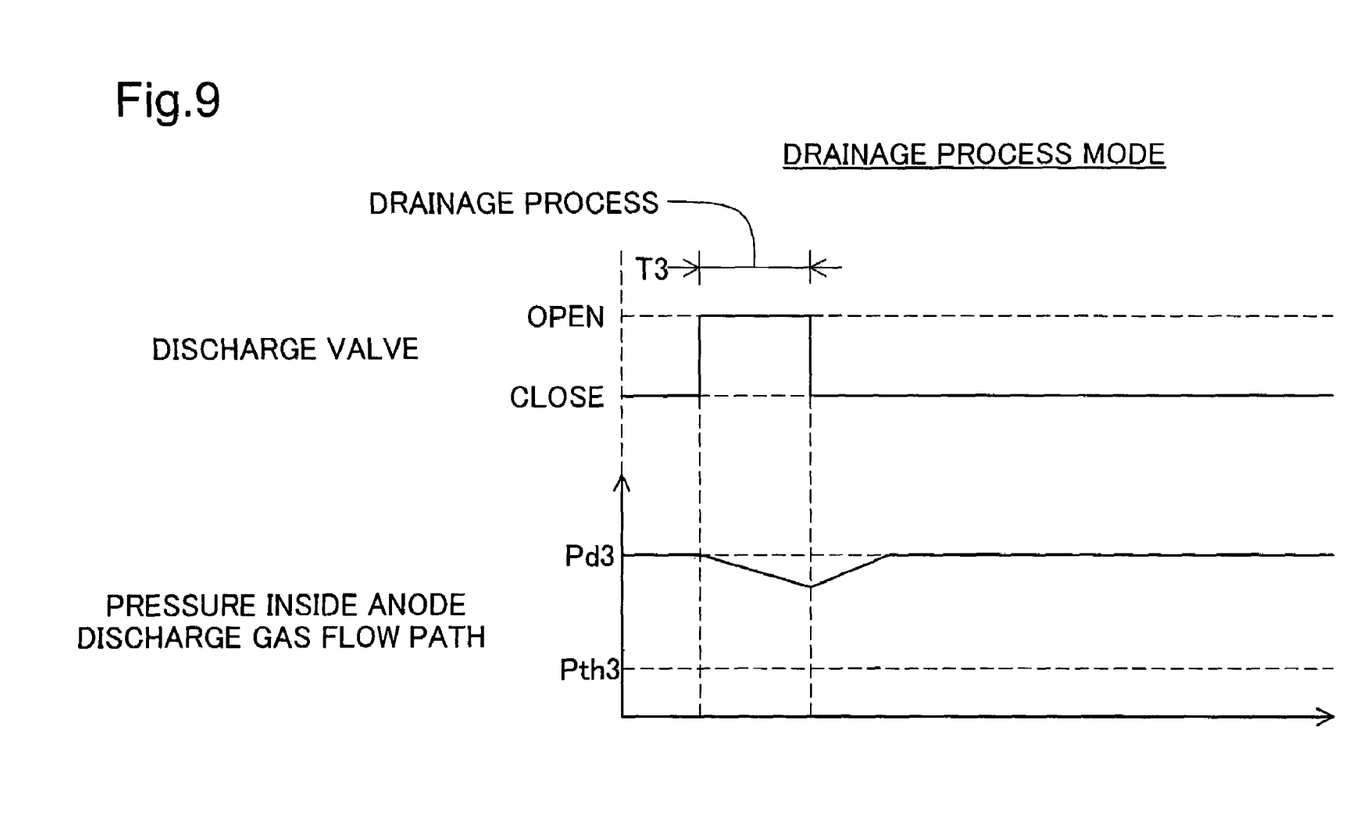
FIG. 9 is a timing chart showing an example of a drainage process.

FIG. 9 is a timing chart describing an example of the drainage process in step S230 in FIG. 8. The timing chart of FIG. 9 shows changes over time of the open/close state of the discharge valve 222 (FIG. 2), and changes in the pressure inside the anode discharge gas flow passage 26 following the opening/closing of the discharge valve 222.

The difference from the discharge processes shown in FIG. 4 and FIG. 7 is that discharge of the water accumulated in the water trap 200 (FIG. 2) is executed so that the anode discharge gas will not be discharged. In other words, the discharge valve 222 (FIG. 2) is closed before the water accumulated in the water trap 200 is completely discharged.

In the drainage process mode shown in FIG. 9, the discharge valve control unit 52 (FIG. 1) opens the discharge valve 222 for a predetermined drainage time T3.

The drainage time T3 is set to become shorter than the time for completing the discharge of the water accumulated in the water trap 200. Consequently, the water accumulated in the water trap 200 is discharged in this drainage process so that anode discharge gas is not discharged at all, or only small amount of anode discharge gas is discharged if any. This drainage process lowers the pressure inside the anode discharge gas flow passage 26 from the operating pressure Pd3, which depends on the load on the fuel cell, but the pressure is maintained higher than the pressure Pth3 that can be attained when the anode discharge gas is discharged.

Further, in the water trap control routine shown in FIG. 8, the quantity of water accumulated in the water trap 200 is related to the impurity concentration inside the anode discharge gas flow passage 26, and thus it is related to the reference concentration used in step S220. Therefore, the drainage time T3 may be set based on the reference concentration (or reference integrated power generation amount).

In FIG. 8, the process returns to step S200 again after the drainage process in step S230 is completed.

When the circulation pump 28 is not operating (step S210: No), the discharge process may be executed in step S240. This discharge process in step S240 is the same as step S120 of FIG. 3, and the water accumulated in the water trap 200 is reliably discharged accordingly. The discharge process may be executed in the first mode shown in FIG. 4 or the second mode shown in FIG. 7.

In the fourth embodiment described above, when the circulation pump 28 is not operating, a discharge process is executed for reliably discharging the accumulated water. This prevents freezing of water inside the anode discharge gas flow passage 26 while the fuel cell system 100 is not operating. When the circulation pump 28 is operating, on the other hand, the drainage process that dose not discharge the anode discharge gas is executed, thereby reducing discharge of hydrogen gas and improving fuel efficiency.

Incidentally, high concentration of impurities in the anode gas (such as nitrogen) may sometimes affect a life of the fuel cell 10. In this case, it is preferable to provide another gas discharge valve (not shown) in the anode discharge gas flow passage 26 separately from the water trap 200. By opening the additional gas discharge valve to discharge the anode discharge gas when the impurities concentration increases, it is possible to prevent excessive increase in the impurity concentration in the anode gas supplied to the fuel cell 10.

E. MODIFIED EXAMPLES

E1. Modified Example 1

For the parameter value related to the impurity concentration inside the anode discharge gas flow passage 26, various parameter values can be used other than the integrated power generation amount of the fuel cell 10. For example, an elapsed time from the last discharge process or the integrated power generation time of the fuel cell 10 may be used as the parameter value related to the impurity concentration, and the impurity concentration may be estimated from the parameter value. Further, the impurity concentration can also be directly measured using a nitrogen concentration sensor or similar device.

E2. Modified Example 2

In the embodiments shown in FIG. 4 and FIG. 7, the judgment as to whether or not water is accumulated in the water trap 200 is readily executed because it is done by comparing the pressure inside the anode discharge gas flow passage 26 with the predetermined gas-discharge pressure Pth1 or Pth2. Various other methods can be used for the judgment other than the comparison between the pressure inside the anode discharge gas flow passage 26 and the gas-discharge pressure Pth1, Pth2. For example, it is possible to judge that water is not accumulated when the pressure in the anode discharge gas flow passage 26 changes at a relatively large rate while the discharge valve 222 is open, and to judge that water is accumulated in the water trap 200 when the pressure changes at a relatively small rate. In short, it is possible to properly judge whether or not water is accumulated in the water trap 200 regardless of the quantity of accumulated water by means of executing the judgment based on pressure variation in the anode discharge gas flow passage 26 while the discharge valve 222 is kept open.

E3. Modified Example 3

In the embodiment of the discharge process shown in FIG. 4, the process after establishing a "judgment that water is not accumulated in the water trap 200" may be changed in consideration of the quantity of anode discharge gas to be discharged.

For example, assume here that the gas-discharge pressure Pth1 is set such that sufficient impurities will be discharged without excessive discharge of hydrogen gas while the pressure in the anode discharge gas flow passage 26 reaches down to the pressure Pth1. When a judgment that water is not accumulated is established using this gas-discharge pressure Pth1, excessive discharge of hydrogen gas can be prevented by closing the valve even before the discharge time T1 passes.

Alternatively, assume that the gas-discharge pressure Pth1 is set such that sufficient impurities will be discharged without excessive discharge of hydrogen gas if the valve is kept open for a fixed time T4 even after the pressure in the anode discharge gas flow passage 26 reaches down to the pressure Pth1. In this case, the valve is kept open for the fixed time T4 even after the discharge time T1 has passed, thereby discharging sufficient impurities while avoiding excessive discharge of hydrogen gas. If the fixed time T4 is set to be equal to the discharge time T1, it means that the discharge operation repeats one more time after establishing a judgment that water is not accumulated. This simplifies the control of the discharge valve 222 for discharging impurities while avoiding excessive discharge of hydrogen gas.

E4. Modified Example 4

The embodiment shown in FIG. 2 uses the water trap 200 having the cyclone separator 210 as a gas-liquid separator. Various other devices and methods can be used as a gas-liquid separator. An exemplary device or method cools and condenses water vapor in the anode discharge gas, and collects the water.

Figure 10:
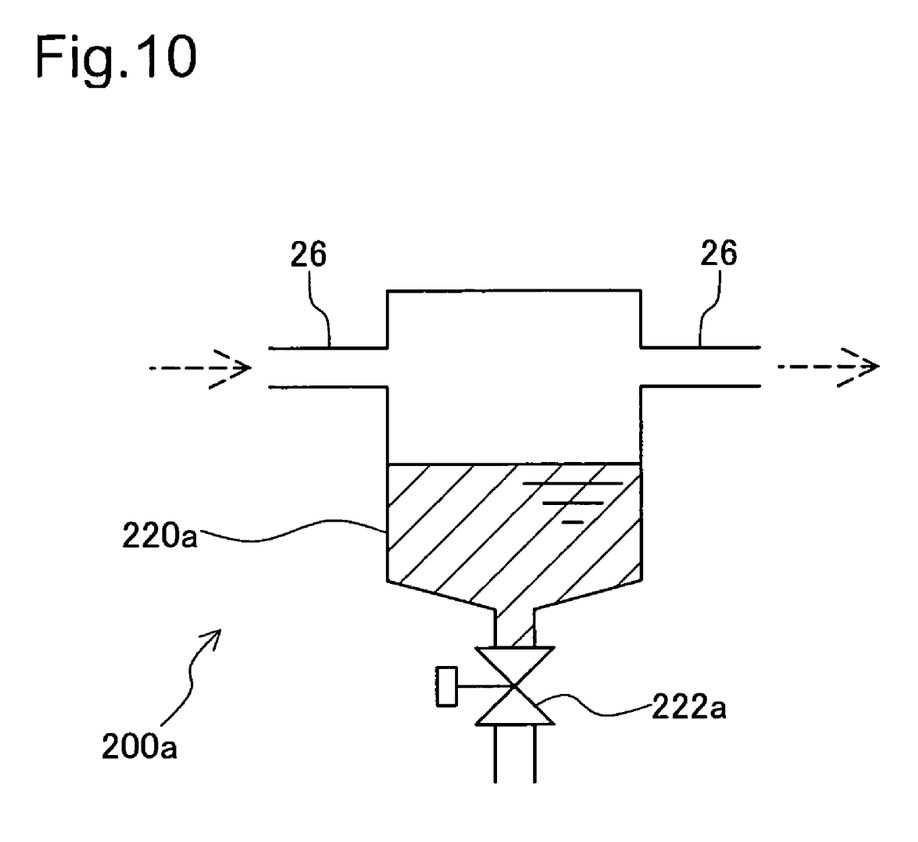
FIG. 10 is an explanatory diagram showing the configuration of another water trap.

The present invention is also applicable to a system including a water trap that is not equipped with a gas-liquid separation function. FIG. 10 is an explanatory drawing that shows an example of a water trap that is not equipped with a gas-liquid separation function. The difference from the water trap 200 shown in FIG. 2 is that the cyclone separator 210 is not provided. The water trap 200a shown in FIG. 10 is equipped with a liquid pool section 220a, and a discharge valve 222a is provided on the bottom of the liquid pool section 220a. The liquid pool section 220a is connected to the anode discharge gas flow passage 26. Water that condenses inside the anode discharge gas flow passage 26 and flows to the liquid pool section 220a or water that condenses inside the water trap 200 accumulates in the liquid pool section 220a. With this type of liquid pool section 220a, the accumulated water can be reliably discharged by executing a discharge process based on pressure variations inside the anode discharge gas flow passage 26.

E5. Modified Example 5

Although, in the embodiment of the water trap control process shown in FIG. 8, it is judged in step S210 which of the discharge process of step S240 and the drainage process of step S230 is to be executed according to the operating state of the circulation pump 28, it is also possible to use various other methods. For example, the discharge process may be executed while the fuel cell 10 is generating power, and the drainage process may be executed while the power generation stops. For either case, it is preferable to judge whether or not the fuel cell system 100 is in a specific operating state that will let the temperature of the fuel cell 10 or the anode discharge gas flow passage 26 to easily drop according to the ambient temperature, and to execute a discharge process for reliably discharging accumulated water when the system is in the specific operating state. When the fuel cell system 100 is left at a low temperature under the freezing temperature, implementing the above actions will make it possible to prevent the water inside the anode discharge gas flow passage 26 from freezing and to maintain operation of the fuel cell system 100.

E6. Modified Example 6

In the embodiments described above, when the surface area of the water accumulated in the water trap that makes contact with the anode discharge gas is large, there is a possibility that the surface of the water will ripple due to the flow of the gas inside the water trap, and difference of pressure measurements inside the anode discharge gas flow passage 26 will become larger accordingly. Thus it is preferable for the surface area of the water (surface area SW1 in the example of FIG. 2(a)) accumulated in the water trap to be small. Specifically, it is preferable for the surface area to be 20 times or less a cross-sectional area (surface area SF1a, SF1b in the example of FIG. 2(a)) proximate to the connection of the anode discharge gas flow passage 26 and the water trap 200. It is especially preferable for the surface area to be 10 times or less and optimally 5 times or less the cross-sectional area. This configuration allows precise measurement of the pressure inside the anode discharge gas flow passage 26.

E7. Modified Example 7

Although the fuel cell system utilizes re-circulation of anode discharge gas from the fuel cell 10 in the above embodiments, the present invention is also applicable to a fuel cell system with a configuration that discharges anode discharge gas without re-circulating it. Further, another water trap may be disposed in the cathode discharge gas flow passage 36 for discharging water in the cathode discharge gas flow passage 36. Further, a water trap may also be disposed on the anode gas supply flow path 24 and/or the cathode gas supply flow path 34 to discharge accumulated water. In general a water trap for discharging water may be disposed in a gas flow passage where water might accumulate; it will prevent the water from freezing inside the gas flow passage. It is also possible to properly judge whether or not water is accumulated in the water trap regardless of the quantity of accumulated water by executing the judgment based on pressure variation inside the gas flow passage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel cell system comprising:
   a fuel cell;
   a gas flow passage for at least one of supplying a specific gas to the fuel cell and discharging a discharge gas from the fuel cell;
   a water trap, disposed in the gas flow passage, for accumulating water in the gas flow passage, the water trap having a discharge valve for discharging the accumulated water to outside of the gas flow passage;
   a discharge valve controller for controlling an open/close state of the discharge valve;
   a pressure measurement unit for measuring a pressure inside the gas flow passage; and
   a judgment unit for judging whether or not water is accumulated in the water trap based on a pressure variation measured by the pressure measurement unit when the discharge valve is open.

2. A fuel cell system according to claim 1, wherein the judgment unit judges that water is not accumulated in the water trap when the discharge valve is open and the pressure measured by the pressure measurement unit is equal to or less than a predetermined gas-discharge pressure.

3. A fuel cell system according to claim 1, wherein the discharge valve controller executes a discharge process for discharging the accumulated water by controlling the open/close state of the discharge valve so that the judgment unit can establish a judgment that water is not accumulated in the water trap.

4. A fuel cell system according to claim 3, wherein the discharge valve controller has a first discharge process mode that repeats a discharge operation, in which the discharge valve is opened for a predetermined discharge time and then closed, wherein the discharge valve controller repeats the discharge operation until the judgment that water is not accumulated in the water trap is established within the predetermined discharge time.

5. A fuel cell system according to claim 4, wherein the discharge valve controller repeats the first discharge process mode in a cyclic period that is longer than a cyclic period of the discharge operation.

6. A fuel cell system according to claim 3, wherein the discharge valve controller has a second discharge process mode that changes the discharge valve from a closed state to an open state and then to a closed state in response to the establishment of the judgment that water is not accumulated in the water trap.

7. A fuel cell system according to claim 3, wherein the gas flow passage has a circulation path for returning the discharge gas from the fuel cell to the fuel cell again,
   and wherein the discharge valve controller judges whether or not an impurity concentration inside the gas flow passage is higher than a predetermined reference concentration according to a specific parameter value related to the impurity concentration inside the gas flow passage, and then executes the discharge process when the impurity concentration is judged to be higher than the reference concentration.

8. A fuel cell system according to claim 7, wherein the discharge valve controller judges that the impurity concentration is higher than the reference concentration when an integrated power generation amount of the fuel cell reaches a predetermined reference integrated power generation amount.

9. A method of controlling a fuel cell system including a fuel cell, a gas flow passage for at least one of supplying a specific gas to the fuel cell and discharging a discharge gas from the fuel cell, and a water trap disposed in the gas flow passage for accumulating water in the gas flow passage, the water trap having a discharge valve for discharging the accumulated water to outside of the gas flow passage, the method comprising:
   (a) controlling an open/close state of the discharge valve;
   (b) measuring a pressure inside the gas flow passage; and
   (c) judging whether or not water is accumulated in the water trap based on a pressure variation measured by the pressure measurement unit when the discharge valve is open.

10. A method according to claim 9, wherein (c) includes judging that water is not accumulated in the water trap when the pressure measured when the discharge valve is open is equal to or less than a predetermined gas-discharge pressure.

11. A method according to claim 9, wherein (a) includes executing a discharge process for discharging the accumulated water in which the open/close state of the discharge valve is controlled so that a judgment that water is not accumulated in the water trap is established.

12. A method according to claim 11, wherein (a) includes executing a first discharge process mode that repeats a discharge operation, in which the discharge valve is opened for a predetermined discharge time and then closed, wherein the discharge operation is repeated until the judgment that water is not accumulated in the water trap is established within the predetermined discharge time.

13. A method according to claim 12, wherein (a) includes repeating the first discharge process mode in a cyclic period that is longer than a cyclic period of the discharge operation.

14. A method according to claim 11, wherein (a) includes executing a second discharge process mode that changes the discharge valve from a closed state to an open state and then to a closed state in response to the establishment of the judgment that water is not accumulated in the water trap.

15. A method according to claim 11, wherein the gas flow passage has a circulation path for returning the discharge gas from the fuel cell to the fuel cell again, and wherein (a) includes judging whether or not an impurity concentration inside the gas flow passage is higher than a predetermined reference concentration according to a specific parameter value related to the impurity concentration inside the gas flow passage, and executing the discharge process when the impurity concentration is judged to be higher than the reference concentration.

16. A method according to claim 15, wherein (a) includes judging that the impurity concentration is higher than the reference concentration when an integrated power generation amount of the fuel cell reaches a predetermined reference integrated power generation amount.

* * * * *